United States Patent
Zhu et al.

(10) Patent No.: US 8,605,679 B2
(45) Date of Patent: Dec. 10, 2013

(54) METHOD FOR AVOIDING RESOURCE BEING RELEASED MISTAKENLY DURING TRACKING AREA UPDATE OR HANDOVER PROCESS

(75) Inventors: Jinguo Zhu, Shenzhen (CN); Min Fang, Shenzhen (CN); Zaifeng Zong, Shenzhen (CN); Minya Ye, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 481 days.

(21) Appl. No.: 12/531,520

(22) PCT Filed: Dec. 29, 2007

(86) PCT No.: PCT/CN2007/003902
§ 371 (c)(1),
(2), (4) Date: Sep. 16, 2009

(87) PCT Pub. No.: WO2008/113235
PCT Pub. Date: Sep. 25, 2008

(65) Prior Publication Data
US 2010/0135245 A1 Jun. 3, 2010

(30) Foreign Application Priority Data

Mar. 20, 2007 (CN) .......................... 2007 1 0088239
Apr. 29, 2007 (CN) .......................... 2007 1 0097791

(51) Int. Cl.
*H04W 4/00* (2009.01)
(52) U.S. Cl.
USPC ............................ 370/331; 370/255; 455/436
(58) Field of Classification Search
None
See application file for complete search history.

(56) References Cited

U.S. PATENT DOCUMENTS

| 6,763,233 | B2 * | 7/2004 | Bharatia | 455/433 |
| 7,649,837 | B1 * | 1/2010 | Puuskari | 370/225 |
| 2002/0021681 | A1 * | 2/2002 | Madour | 370/331 |
| 2004/0022212 | A1 * | 2/2004 | Chowdhury et al. | 370/329 |
| 2007/0025294 | A1 * | 2/2007 | Kim et al. | 370/331 |
| 2007/0213060 | A1 * | 9/2007 | Shaheen | 455/436 |

FOREIGN PATENT DOCUMENTS

| CN | 1697394 A | 11/2005 |
| CN | 1722901 A | 1/2006 |
| CN | 1842049 A | 10/2006 |
| CN | 1889757 A | 1/2007 |

OTHER PUBLICATIONS

Jokinen, Changing LTE Specific Anchor With Simple Tunnel Switching, Jun. 16, 2006, U.S. Appl. No. 60/814,042.*

* cited by examiner

*Primary Examiner* — Ian N Moore
*Assistant Examiner* — Brian T Le
(74) *Attorney, Agent, or Firm* — Woodcock Washburn LLP

(57) ABSTRACT

A method for avoiding resource being released mistakenly during tracking area update or handover process comprising: determining, by a target Mobility Management Entity MME, whether to use an old System Architecture Evolution Serving GW or to reselect a new Serving GW; if the target MME determines to select a new serving GW, notifying the original MME, the original MME sending a request for deleting bearer to the old Serving GW. The technical scheme of the present invention can avoid that the original MME will still send a request for deleting subscriber context to the old Serving GW when the target MME still uses the old Serving GW rather than selects a new one during tracking area update or handover process of the subscriber, which results in the appearance of a problem that the resource related to the subscriber in the old Serving GW is released mistakenly.

10 Claims, 5 Drawing Sheets

METHOD FOR AVOIDING RESOURCE BEING RELEASED MISTAKENLY DURING TRACKING AREA UPDATE OR HANDOVER PROCESS

TECHNICAL FIELD

The present invention relates to the field of radio communication, and more particularly, relates to a method for avoiding resource being mistakenly released during tracking area update or handover process.

BACKGROUND OF THE INVENTION

With the Wimax (World Interoperability for Microwave Access) as a new force suddenly rises, the 3rd Generation Mobile Communication System should improve its network performance and reduce the cost of network construction and operation in order to sustain its strong competitiveness in the field of mobile communication. Therefore, the standardization workgroup of 3GPP (3rd Generation Partnership Project) is now working on evolving into PS Core (Packet Switch Core) and UTRAN (Universal Mobile Telecommunication System Radio Access Network), the research topic is System Architecture Evolution (SAE) and its target is to make the evolved PS Core (E-PS Core) be capable of providing higher transmission speed, shorter transmission delay and optimal packet, and supporting mobility management among E-UTRAN (Evolved UTRAN), UTRAN, WLAN (Wireless Local Area Network) and other non-3GPP access networks.

Nowadays, the architecture of the SAE is shown as FIG. 1, which comprises the following network elements:

E-RAN (Evolved Radio Access Network), which could provide higher uplink and downlink speeds, shorter transmission delay and more reliable radio transmission. The network element included in E-RAN is eNodeB (Evolved NodeB) which provides radio resource for the subscriber access.

HSS (Home Subscriber Server), which is used for permanently storing the subscription data.

PDN (Packet Data Network), which is a network providing services for the subscribers.

E-Packet Core (Evolved Packet Network), which provides shorter delay and allows the access of more radio access systems, and comprises the following network elements:

MME (Mobility Management Entity): a control plane functional entity, and a server for temporarily storing the subscriber data, being responsible for managing and storing the context of UE (User Equipment) (such as the UE/subscriber identifier, mobility management status, subscriber security parameters, and so on), distributing temporary identifier for the subscriber, and processing all messages in the non-access-layer between MME and UE when the UE being in the tracking area or the network is responsible for authorizing the subscriber;

Serving GW (Gateway): Serving Gateway, which is a subscriber plane entity responsible for route processing the subscriber plane data and terminating the downlink data of the UE in idle status; managing and storing SAE bearer context of UE, such as the IP bearer service parameters and network internal route information, and so on; the anchor point of the subscriber plane within the 3GPP system, and one subscriber can only have one Serving GW at one time;

PDN GW: Packet Data Network Gateway, which is responsible for the gateway function of the UE accessing to PDN and is the mobility anchor point of 3GPP and non-3GPP access systems. And the subscriber can access to several PDN GWs at the same time.

The mobility management is an evident characteristic of the radio communication system. When a subscriber moves from an area controlled by one eNodeB to another area controlled by another eNodeB, the corresponding MME and Serving GW might change. If the subscriber moves in the idle mode, the UE will initiates the process of tracking area update, and if the subscriber moves in the active mode, the process of handover will be initiated. In these processes, the subscriber data and the related context will be reestablished in the target MME which might reselect a new Serving GW, and the resource related to the subscriber in the original MME and in the Serving GW will be released.

In the prior art, the release of the resource related to the subscriber in the original Serving GW will be initiated by the original MME, as shown in FIG. 2.

Step 201: the target MME sends a request for updating the subscriber data to the HSS to request the HSS to send the subscription data to the target MME;

Step 202: the HSS returns a response of subscriber data updated to the target MME after sending the subscription data to the target MME;

Step 203: the HSS sends a request for deleting the subscriber data to the original MME to delete the subscriber data in the original MME;

Step 204: if a Serving GW used by the subscriber was found in the original MME, a request for deleting bearer context is sent to the Serving GW; and the Serving GW is called as the original Serving GW or the old Serving GW.

Step 205: the original Serving GW returns a response of bearer context deleted after deleting the context of the corresponding subscriber;

Step 206: the original MME returns a response of subscriber data deleted to the HHS after deleting the subscriber data.

In this technology, when the target MME still uses the old Serving GW instead of selecting a new Serving GW, the original MME will still initiates a request for deleting the subscriber bearer context to the old Serving GW, which will result in the resource related to the subscriber in the old Serving GW being released mistakenly. In this scheme, the original MME can not know whether the target MME selects a new Serving GW or not.

SUMMARY OF THE INVENTION

The technical problem to be solved in the present invention is to provide a method for avoiding resource being released mistakenly during tracking area update or handover process to avoid that the original MME will still sends a request for deleting subscriber bearer context to the old Serving GW when the target MME still uses the old Serving GW instead of selecting a new one during tracking area update or handover process, which results in the appearance of a problem that the resource related to the subscriber in the old Serving GW is released mistakenly.

In order to solve the above technical problem, the present invention provides a method for avoiding resource being released mistakenly during tracking area update or handover process, and the method comprises:

(1) determining, by the target Mobility Management Entity, whether to use the old System Architecture Evolution Serving GW or reselect a new Serving GW;

(2) if the target MME determines to select a new Serving GW, notifying the original MME, the original MME sending a request for deleting the bearer to the old Serving GW by the target MME.

Further, in said step (2):

if the target MME determines to select a new Serving GW, the target MME sends a notification message to the original MME to indicate that the target MME has selected a new Serving GW.

Further, after the target MME sends the notification message to the original MME, if the original MME receives the notification message and determines that the Serving GW has changed, then the original MME sends a request for deleting bearer context to the old Serving GW.

Further, after said step (2) is performed, the old Serving GW returns a response of bearer context deleted to the original MME after releasing the subscriber resource.

Further, the notification message during handover is a message of handover completed, and there is an indication in the message to indicate whether the Serving GW has changed.

Further, the notification message during tracking area update is a message of request for context acknowledgement, and there is an indication in the message to indicate whether the Serving GW has changed.

Further, the notification message during tracking area update is a notification message to indicate that the Serving GW has changed.

Further, step (2) further comprises: if the target MME determines to use the old Serving GW, the original MME will not send the request for deleting the bearer context to the old Serving GW.

The present invention provides that, the resource in the old Serving GW is initiated by the target MME and is released by the original MME. Since the target MME knows whether to use the old Serving MME or reselect a new Serving MME, it will not notify the original MME when the old Serving GW is used, and it will notify the original MME to send a request for deleting only when a new Serving GW is selected, which could solve the problem that the resource in the original Serving GW is released mistakenly, thereby to ensure that the update or handover can be smoothly implemented.

PREFERRED EMBODIMENTS OF THE PRESENT INVENTION

The technical scheme of the present invention will be described in further detail in combination with the accompanying drawings and embodiments.

Figure 1:
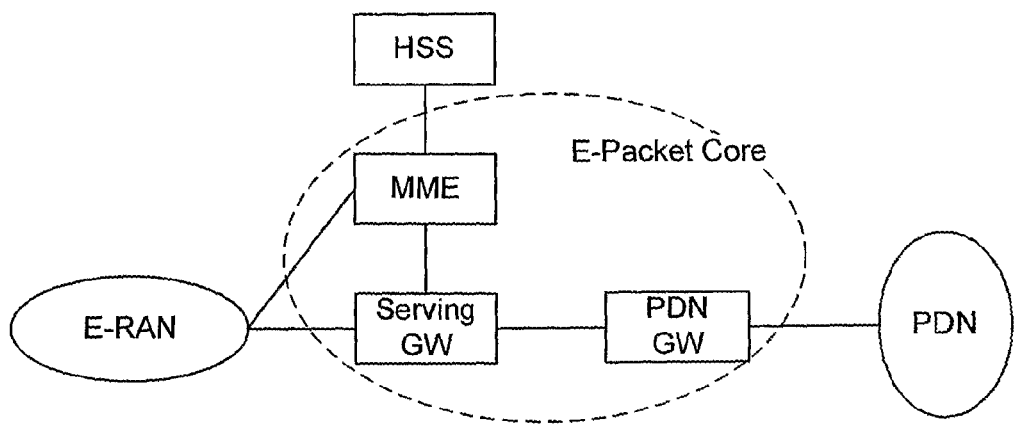
FIG. 1 is an architecture of the SAE in the prior art.
Figure 2:
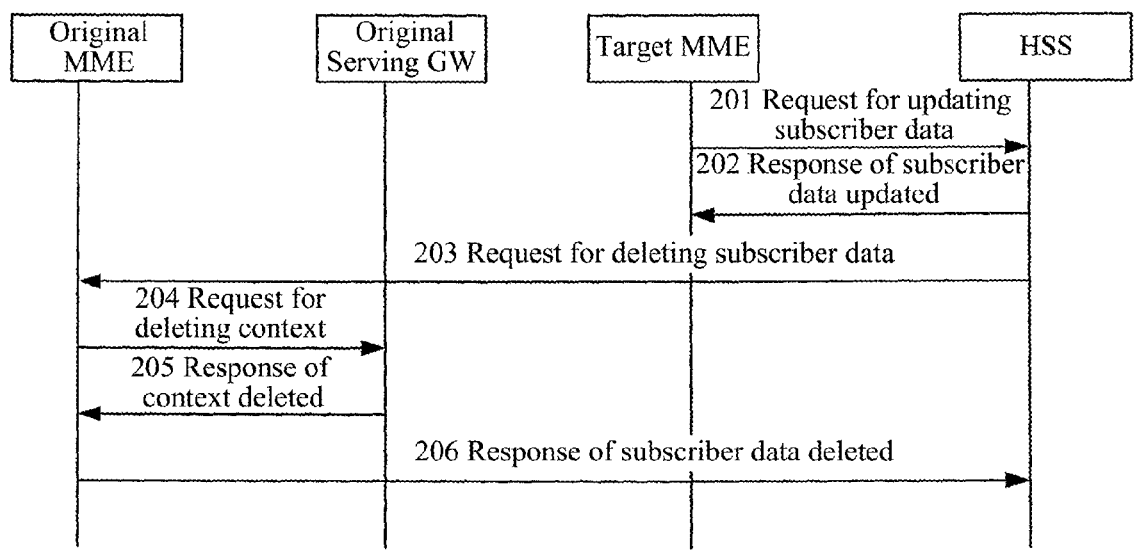
FIG. 2 is a flow chart of the old Serving GW releasing in the prior art.
Figure 3:
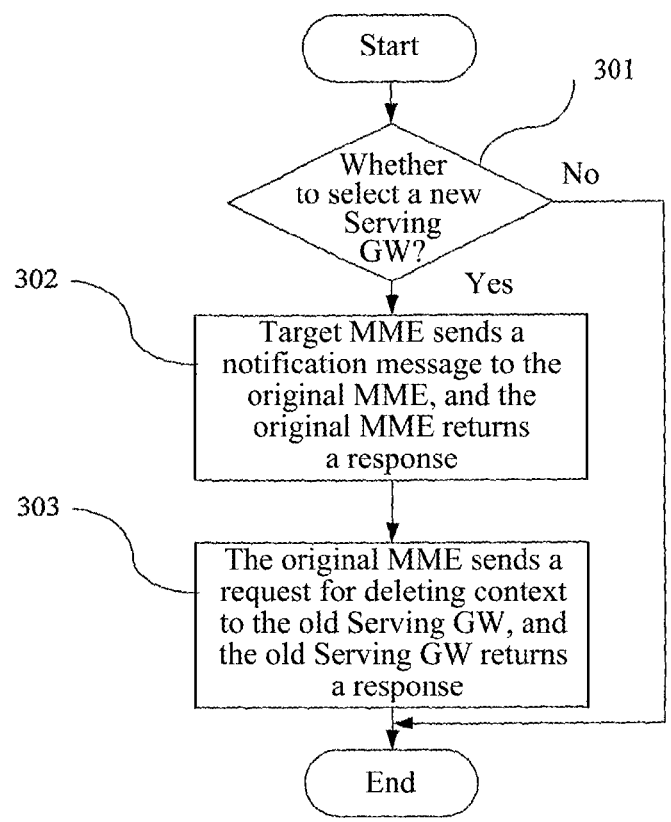
FIG. 3 is the flow chart of an embodiment of the present invention.

As shown in FIG. 3, the present embodiment comprises the following steps:

step 301, determining, by the target MME, whether to use the old Serving GW or reselect a new Serving GW;

step 302, if the target MME determines to select a new Serving GW, sending a notification message to the original MME by the target MME to indicate that the target MME has selected a new Serving GW; alternatively, the message includes the information of the address of the new Serving GW (when the original MME is Serving GPRS Support Node (SGSN), the SGSN should establish a tunnel to the new Serving GW, and at this moment, the information of the address of the new Serving GW is needed); alternatively, the original MME will return a response to the target MME.

Step 303, after the original MME receives the notification message, if original MME determines that the Serving GW has changed, sending a request for deleting bearer context to the old Serving GW by the original MME; alternatively, the old Serving GW returns a response of bearer context deleted to the original MME after releasing the subscriber resource.

Alternatively, in step 302, after the target MME determines to select a new Serving GW, before the target MME sends the notification message to the original MME, the target MME sends a request for establishing bearer to the new Serving GW; the new Serving GW distributes the related bearer resource, and returns a response of bearer established to the target MME after establishing the bearer.

The other processes are the same as those in the prior art.

If the target MME determines to use the old Serving GW, there is no need to perform step 302~step 303. That is, when using the old Serving GW, the original MME will not indicate the old Serving GW to delete the bearer context so as to avoid the resource in the old Serving GW being mistakenly released.

Figure 4:
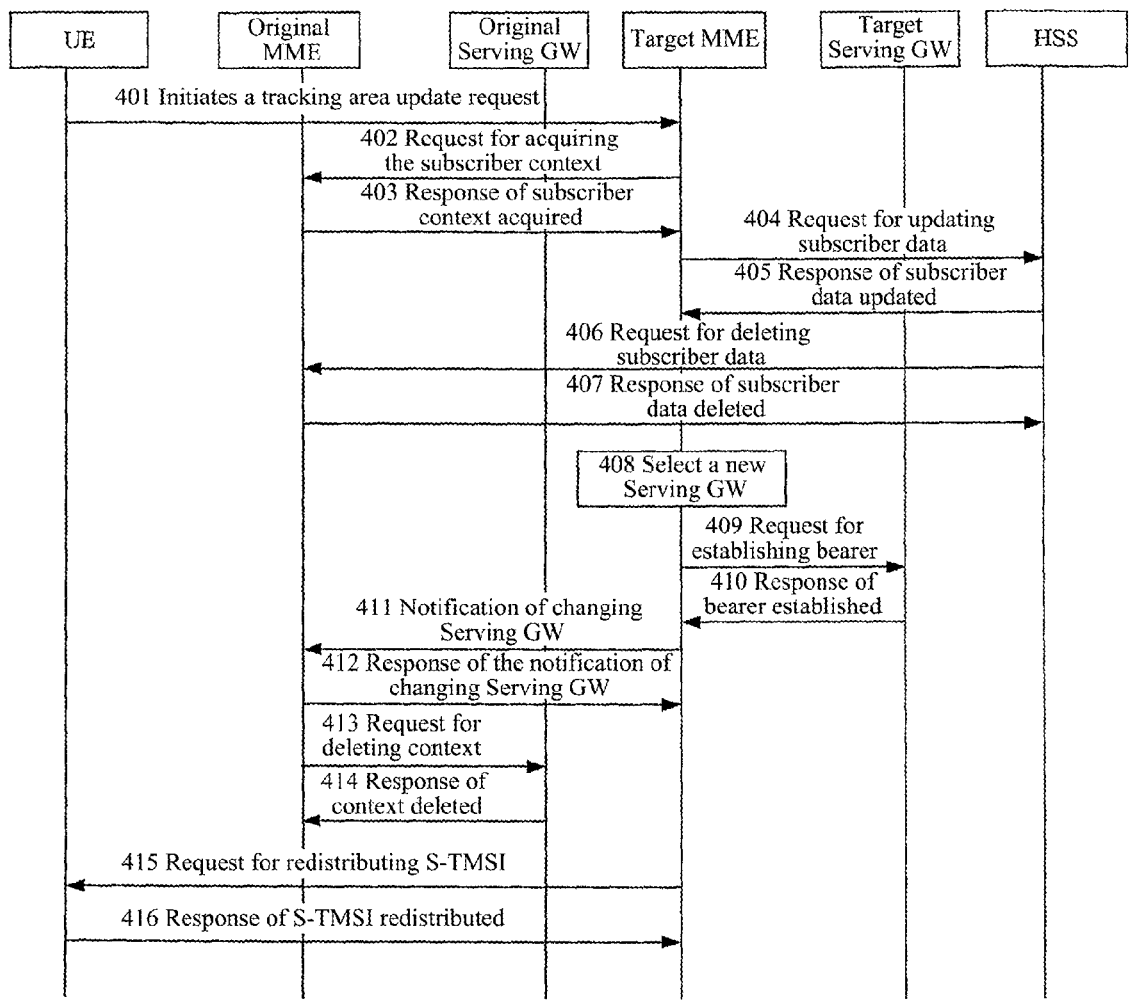
FIG. 4 is a flow chart applied in the process of tracking area update in accordance with an embodiment of the present invention.

As shown in FIG. 4, the embodiment applied in the process of tracking area update will be described in detail:

step 401: the UE initiates a tracking area update request to the network when finding that the current tracking area is not the originally registered tracking area; after eNodeB receives the request, it forwards the tracking area update request to the MME (the target MME) if it determines that the tracking area is under the management of another MME, wherein the request includes the information of the old S-TMSI (S-Temporary Subscriber Identity) of the subscriber, the old tracking area identity and the current tracking area identity;

step 402: after the target MME receives said tracking area update request, the target MME could derive the MME registered last time by the subscriber according to the old tracking area identity, and then it sends a request for acquiring the subscriber context to the MME (that is, the original MME), wherein the request includes the old S-TMSI of the subscriber;

step 403: after the original MME receives the request, it could acquire the subscriber context according to the S-TMSI and send the context to the target MME. The context has the address of the current used Serving GW (that is, the old Serving GW);

step 404: the target MME sends a request for updating subscriber data to the HSS to request HSS to send the subscription data to the target MME;

step 405: the HSS returns a response of subscriber data updated to the target MME after sending the subscription data to the target MME;

step 406: the HSS initiates a request for deleting the subscriber data to the original MME to delete the subscriber data in the original MME;

step 407: the original MME returns a response of subscriber data deleted to the HSS after deleting the subscriber data;

step 408: the target MME determines to select a new Serving GW;

step 409: the target MME sends a request for establishing bearer to the new Serving GW;

step 410: the new Serving GW distributes the related bearer resource, and after the bearer is established, returns a response of bearer established to the target MME;

step 411: the target MME initiates a notification message indicating that the Serving GW has changed to the original MME, wherein the notification message has the information of the address of the new Serving GW;

step 412, the original MME returns a message of response of the notification;

step 413, the original MME sends a request for deleting bearer context to the old Serving GW;

step 414, the old Serving GW returns a response of the bearer context deleted to the original MME after releasing the subscriber resource;

step 415, the target MME redistributes S-TMSI and returns the S-TMSI and the current tracking area identity in the message of the S-TMSI redistribution to the UE;

step 416: the UE stores the S-TMSI and the current tracking area identity, and returns a response to the TMSI redistribution.

In the present embodiment, if the target MME determines to continually use the old Serving GW in step 408, there is no need to perform step 409~step 414, but directly perform step 415 and step 416.

For simplification, the processes of unrelated authorization and encryption and the process of the HSS inserting subscriber data into the target MME are omitted in this embodiment, and the implementation of these processes is the same as that in the prior art.

Figure 5:
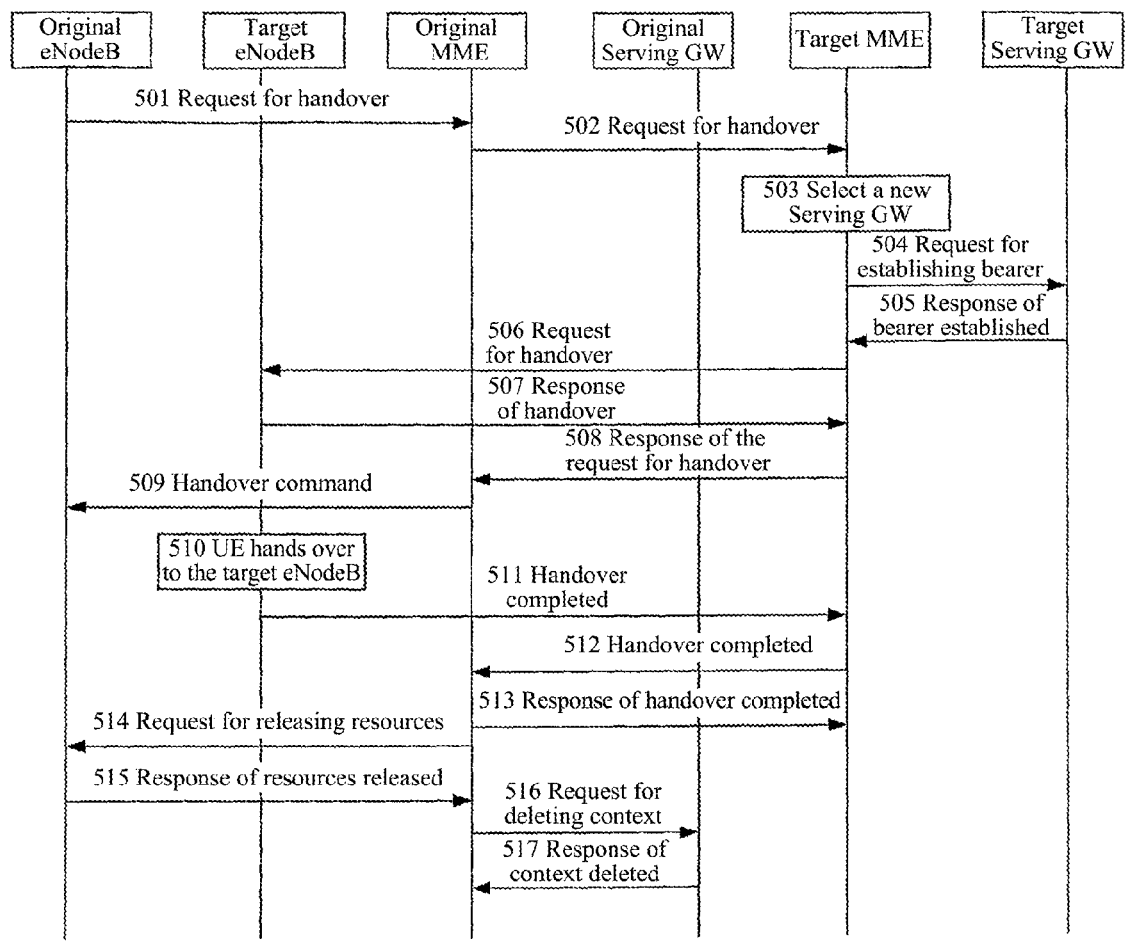
FIG. 5 is a flow chart applied in the process of handover between MMEs in accordance with an embodiment of the present invention.

As shown in FIG. 5, the embodiment applied in the process of handover between MMEs will be described in detail:

step 501: the original eNodeB initiates a message of request for handover including the information of the target tracking area to the original MME according to the signal measurement;

step 502: the original MME finds out the target MME according to the information of the target tracking area, and then sends a request for handover including the information of the target tracking area and the position of the original Serving GW to the target MME;

step 503: after the target MME receives the request, the target MME selects the target eNodeB according to the information of the target cell, and then determines that there is a need to reselect a Serving GW;

step 504: the target MME sends a request for establishing bearer to the reselected target Serving GW to request the target Serving GW to distribute the bearer resource;

step 505: the target Serving GW returns a response of bearer established to the target MME after distributing the bearer resource, wherein the response includes the information of the distributed subscriber plane resource;

step 506: the target MME sends a request for handover to the target eNodeB to request the target eNodeB to distribute bearer resource, and brings the information of the subscriber plane resource of the Serving GW to the target eNodeB;

step 507: the target eNodeB returns a message of a response of handover including the information of bearer resource and air interface radio resource distributed by the eNodeB to the target MME after distributing the bearer resource and air interface radio resource;

step 508: the target MME returns a response of handover including the information of air interface radio resource distributed by the target eNodeB to the original MME;

step 509: the original MME sends a message of handover command including the information of air interface radio resource distributed by the target eNodeB to the original eNodeB, and then the original eNodeB commands the UE to start the handover;

step 510: the UE hands over to the target eNodeB according to the information of air interface radio resource distributed by the target eNodeB;

step 511: the target eNodeB reports a message of handover completed to the target MME;

step 512: the target MME sends a message of handover completed to the original MME, the message includes an indication indicating whether the Serving GW has changed, and the message also includes the information of the address of the new Serving GW if the Serving GW has changed;

step 513: the original MME returns a message of a response of handover completed to the target MME;

step 514: the original MME sends a request for releasing the resource to the original eNodeB;

step 515: the original eNodeB sends a response of the resource released to the original MME after releasing the related resource;

step 516: the original MME sends a request for deleting the bearer context to the original Serving GW if learning that the Serving GW has changed in step 512;

step 517: the original Serving GW returns a response of bearer context deleted to the original MME after releasing the subscriber resource.

Wherein, step 514 and step 515 can be performed at the same time with step 516 and step 517.

If the target MME determines to continually use the original Serving GW in step 503, then there will no indication indicating that the Serving GW has changed in step 512, and no need to perform step 504, step 505, step 516 and step 517.

Figure 6:
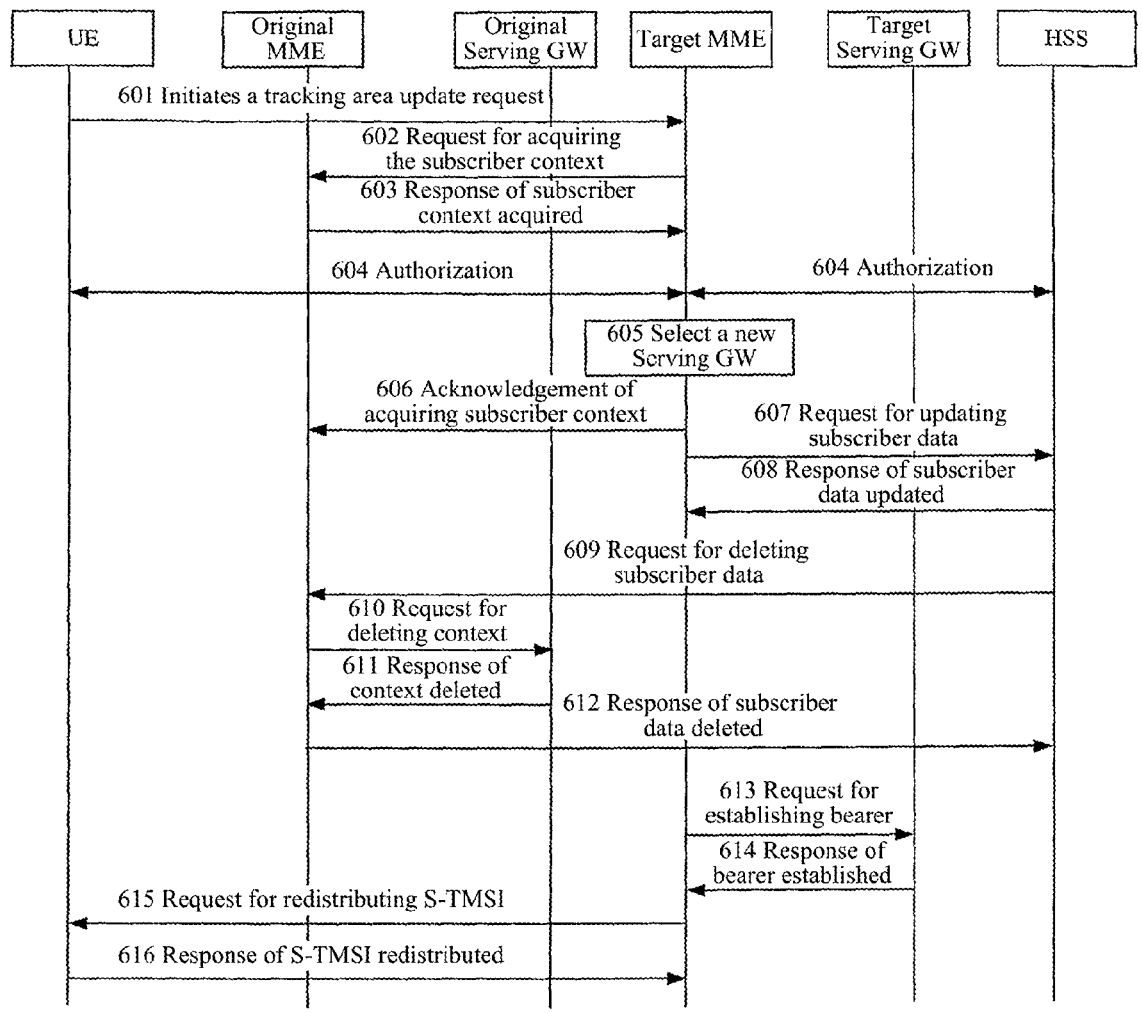
FIG. 6 is another flow chart applied in the process of tracking area update in accordance with an embodiment of the present invention.

As shown in FIG. 6, another embodiment applied in the process of tracking area update will be described in detail:

step 601: the UE initiates a tracking area update request to the network when finding that the current tracking area is not the originally registered tracking area; after eNodeB receives the request, the eNodeB forwards the tracking area update request to the MME (that is, the target MME) if it determines that the tracking area is under the management of another MME, wherein the request includes the information of the old S-TMSI (S-Temporary Subscriber Identity) of the subscriber, the old tracking area identity and the current tracking area identity;

step 602: the target MME could derive the MME registered last time by the subscriber according to the old tracking area identity after receiving the tracking area update request, and it sends a request for acquiring the subscriber context to the MME (that is, the original MME), wherein the request for acquiring the subscriber context includes the old S-TMSI of the subscriber;

step 603: after the original MME receives the request for acquiring the subscriber context, the original MME could acquire the subscriber context according to the S-TMSI, and send the context to the target MME. The context has the address of the original Serving GW;

step 604: the target MME authorize the subscriber, and the process of authorization includes obtaining authorization parameters from the HSS and authorizing the subscriber;

step 605: after the authorization is successfully performed, the target MME determines to select a new Serving GW according to the address of the original Serving GW;

step 606: the target MME initiates a message for acquiring the context acknowledgement to the original MME, wherein the message includes an indication indicating that the old MME has selected a new Serving GW.

step 607: the target MME sends a request for updating subscriber data to the HSS to request the HSS to send the subscription data to the target MME;

step 608: the HSS returns a response of the subscriber data updated to the target MME after sending the subscription data to the target MME;

step 609: the HSS initiates a request for deleting the subscriber data to the original MME to delete the subscriber data in the original MME;

step 610: the original MME learns from the target MME that a new Serving GW has been reselected, and then sends a request for deleting the bearer context to the old Serving GW;

step 611: the old Serving GW returns a response of the bearer context deleted to the original MME after releasing the subscriber resource;

step 612: the original MME returns a response of subscriber data deleted to the HSS after deleting the subscriber data;

step 613: the target MME sends a request for establishing bearer to the new Serving GW;

step 614: the new Serving GW distributes related bearer resource, and returns a response of bearer established to the target MME after the bearer is established;

step 615: the target MME redistributes S-TMSI, and returns the S-TMSI and the current tracking area identity in the message of S-TMSI redistribution to the UE;

step 616: the UE stores the S-TMSI and the current tracking area identity, and returns a response of TMSI redistributed.

In the present embodiment, if the target MME in step 605 determines to continually use the old Serving GW, there is no need to perform step 610 and step 611.

For simplification, the processes of unrelated encryption and the process of the HSS inserting subscriber data into the target MME are omitted in this embodiment, and the implementation of these processes is the same as that in the prior art.

Of course that the present invention may have several other embodiments, and without departing from the spirit and essence of the present invention, those skilled in the art can make all kinds of corresponding modification and variations according to the present invention, and all of these corresponding modifications and variations should fall into the scope of the claims of the present invention.

INDUSTRIAL APPLICABILITY

The technical scheme of the present invention can avoid that the original MME still sends a request for deleting the subscriber context to the old Serving GW when the target MME still uses the old Serving GW rather than selects a new one during tracking area update or handover process of the subscriber, which results in the appearance of the problem that the resource related to the subscriber in the old Serving GW is released mistakenly.

What we claim is:

1. A method for avoiding a resource being released mistakenly, comprising:
during a tracking area update or handover process from an area controlled by one eNodeB to another area controlled by another eNodeB in a System Architecture Evolution,
(1) determining, by a target Mobility Management Entity, a Serving Gateway for use after the tracking area update or handover process is completed, the target Mobility Management Entity determining the Serving Gateway from at least one of a new Serving Gateway and an old Serving Gateway; and
(2) when the target Mobility Management Entity determines to select a new Serving Gateway, sending a notification message by the target Mobility Management Entity to an original Mobility Management Entity indicating that the target Mobility Management Entity has selected a new Serving Gateway, the original Mobility Management Entity sending a request for deleting bearer context directly to the old Serving Gateway according to the notification message; and
(3) when the target Mobility Management Entity determines to use the old Serving Gateway, avoiding by the original Mobility Management Entity a transmission of a request for deleting bearer context to the old Serving Gateway;
wherein, when the target Mobility Management Entity determines to select a new Serving Gateway and after step (2) is performed, the old Serving Gateway returns a response of bearer context deleted to the original Mobility Management Entity after releasing a subscriber resource.

2. A method of claim 1, wherein after the target Mobility Management Entity sends the notification message to the original Mobility Management Entity, the original Mobility Management Entity receives the notification message, determines that a Serving Gateway has changed, and sends a request for deleting bearer context to the old Serving Gateway.

3. A method of claim 1, wherein the notification message during the handover is a message of handover completed, and there is an indication in the message to indicate whether the Serving Gateway has changed.

4. A method of claim 1, wherein the notification message during the tracking area update is a message of request for context acknowledgement, and there is an indication in the message to indicate whether the Serving Gateway has changed.

5. A method of claim 1, wherein the notification message during the tracking area update is a notification message to indicate that the Serving Gateway has changed.

6. A server for improving a release of a resource, the server comprising:
a memory for storing a target Mobility Management Entity, the target Mobility Management Entity configured to:
during a tracking area update or handover process from an area controlled by one base station to another area controlled by another base station in a System Architecture Evolution,
determine a serving gateway for use after the tracking area update or handover process is completed, the determining comprising a selection of the serving gateway from at least one of a new serving gateway and an old serving gateway; and
when the target Mobility Management Entity determines to select the new serving gateway, send a notification message to an original Mobility Management Entity and cause the original Mobility Management Entity to send a request directly to the old serving gateway for deleting bearer context according to the notification message, the notification message indicating that the system has selected the new serving gateway;
wherein the original Mobility Management Entity is further configured to avoid a transmission of a request for deleting bearer context to the old serving gateway when the target Mobility Management Entity determines to use the old serving gateway;

wherein the target Mobility Management Entity further causes the old serving gateway to return a response of bearer context deleted to the Original Mobility Management entity after releasing a subscriber resource.

7. The server of claim 6, wherein the server further causes the original Mobility Management Entity to determine that the serving gateway has changed and to send a request for deleting bearer context to the old serving gateway.

8. The server of claim 6, wherein the notification message during the handover comprises a message of handover completed and an indication of whether the serving gateway has changed.

9. The server of claim 6, wherein the notification message during the tracking area update comprises a message of request for context acknowledgement and an indication of whether the serving gateway has changed.

10. The server of claim 6, wherein the notification message during the tracking area update comprises a notification message to indicate that the serving gateway has changed.

* * * * *